United States Patent [19]

Robertson

[11] Patent Number: 5,167,419
[45] Date of Patent: Dec. 1, 1992

[54] FLUID SEAL WITH INTEGRAL CHECK VALVE

[75] Inventor: Mark E. Robertson, Laconia, N.H.

[73] Assignee: Freudenberg-NOK General Partnership, Plymouth, Mich.

[21] Appl. No.: 781,749

[22] Filed: Oct. 22, 1991

[51] Int. Cl.[5] ............................................. F16J 15/32
[52] U.S. Cl. ...................................... 277/29; 277/28; 277/153
[58] Field of Search .................. 277/29, 28, 152, 153, 277/35

[56] References Cited

U.S. PATENT DOCUMENTS

| | | | |
|---|---|---|---|
| 2,977,138 | 3/1961 | Brittain, Jr. | 277/29 |
| 3,044,786 | 7/1962 | Chillson . | |
| 3,685,838 | 8/1972 | Malmstrom . | |
| 4,055,352 | 10/1977 | Allinquant et al. . | |
| 4,108,287 | 8/1978 | Kato . | |
| 4,344,631 | 8/1982 | Winn . | |
| 4,428,630 | 1/1984 | Folger et al. | 277/29 |
| 4,433,846 | 2/1984 | Romero et al. | 277/29 |
| 4,448,461 | 5/1984 | Otto | 277/29 |
| 4,494,632 | 1/1985 | de Baan et al. . | |
| 4,508,020 | 4/1985 | Szcupak | 277/153 |
| 4,527,673 | 7/1985 | Szcupak . | |
| 4,533,265 | 8/1985 | Woodbridge | 277/29 |
| 4,747,605 | 5/1988 | Antonini . | |
| 4,844,480 | 7/1989 | Gralka . | |
| 4,896,890 | 1/1990 | Mauney | 277/70 |

FOREIGN PATENT DOCUMENTS

| | | |
|---|---|---|
| 8204156 | 7/1982 | Fed. Rep. of Germany . |
| 3236636 | 4/1984 | Fed. Rep. of Germany . |
| 3410791 | 10/1984 | Fed. Rep. of Germany . |

Primary Examiner—William A. Cuchlinski, Jr.
Assistant Examiner—Daniel G. DePumpo
Attorney, Agent, or Firm—Dinnin & Dunn

[57] ABSTRACT

The present invention is a fluid seal adapted to be disposed about a cylindrical shaft. The fluid seal includes a body portion having an aperture extending axially therethrough and adapted to be disposed about the shaft. The fluid seal also includes a first sealing lip extending from the body portion and adapted to contact the shaft. The fluid seal further includes a second sealing lip extending from the body portion and having a check valve for allowing one way fluid flow through the second sealing lip at a desired pressure.

21 Claims, 2 Drawing Sheets

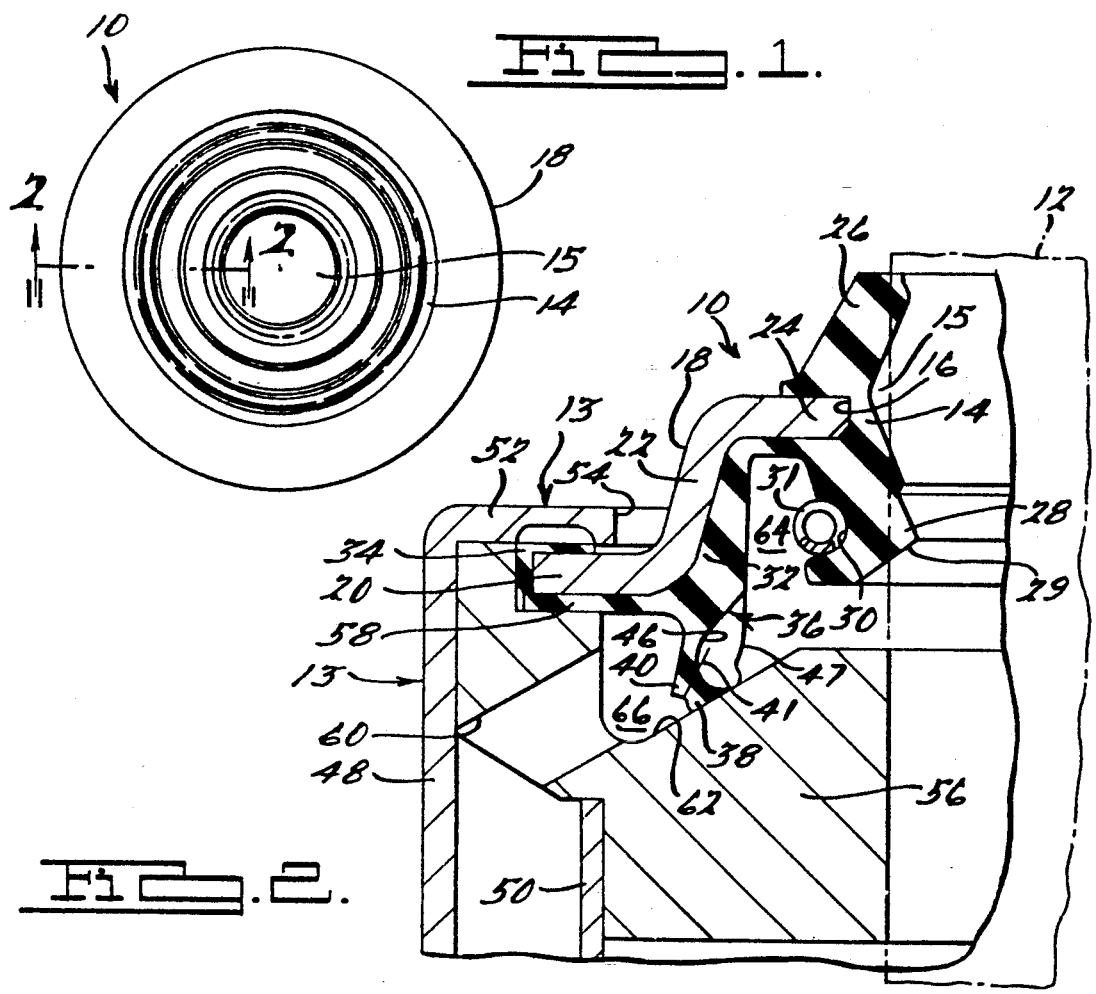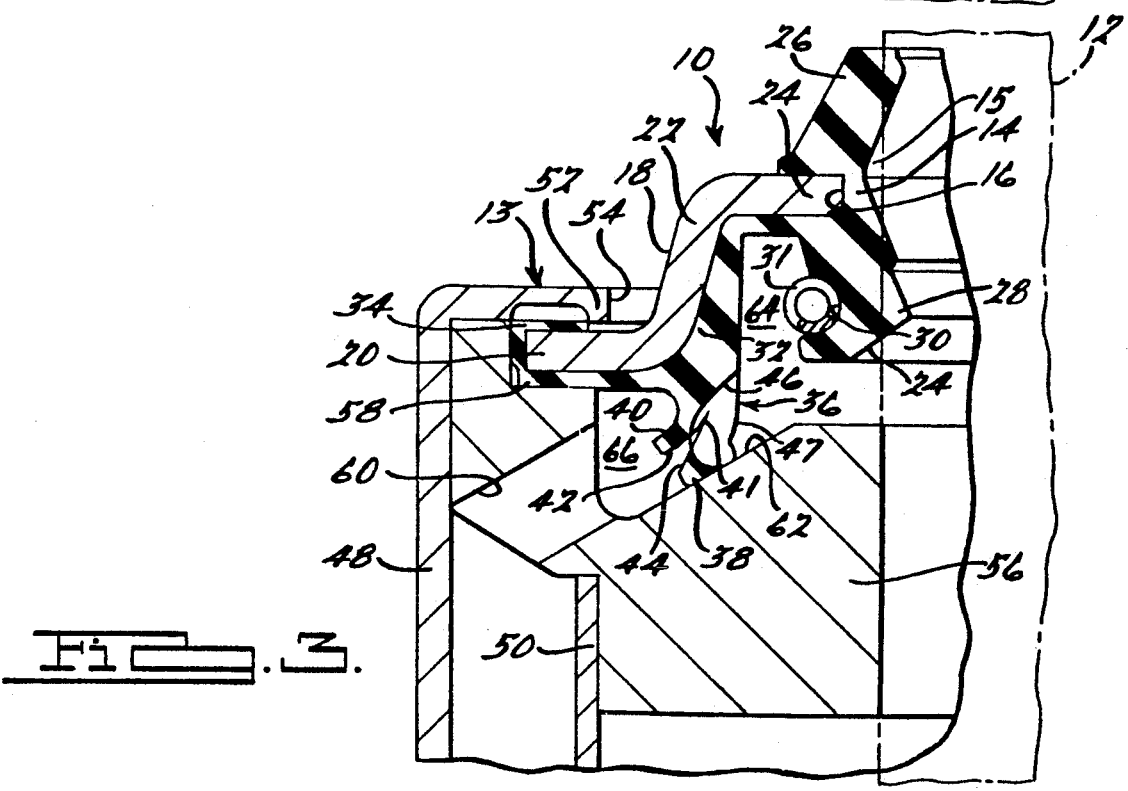

FLUID SEAL WITH INTEGRAL CHECK VALVE

BACKGROUND OF THE INVENTION

1. Field of the Invention

The present invention relates generally to fluid seals, and more particularly to, a fluid seal adapted to be disposed about a cylindrical shaft.

2. Description of the Related Art

Generally, fluid seals are disposed about shafts in motion control dampers, e.g. a piston rod in a shock absorber. Typically, these fluid seals prevent contaminants from entering a housing of the damper while allowing axial movement of the shaft. The fluid seals also retain lubricant within the housing and permit a thin film of lubricant to be disposed on the shaft during movement.

Currently, these dampers may include a gas to aid in dampening. Typically, gas and lubricant are separated within the damper by the fluid seal. As a result, the fluid seal may have one seal portion for the gas and another seal portion for the lubricant along separate paths. An example of such a fluid seal is disclosed in U.S. Pat. No. 4,527,673 to Szcupak. This patented fluid seal includes an elastomeric seal body having a fluid sealing lip which seals against the shaft and a gas sealing lip which seals against a component such as a valve body of the shock absorber to separate a gas retaining portion and a fluid retaining portion. The gas sealing lip also acts as a valve to allow fluid flow in one direction and prevents fluid flow in a reverse direction. For example, under excessive pressure, the gas sealing lip is deflected from the surface of the valve body and fluid may flow between the gas sealing lip and valve body.

One problem with the above patented fluid seal is that the valve body is used as the sealing surface for the valve. Another problem of the patented fluid seal is that the sealing surface must be kept in excellent condition prior to assembly to facilitate proper sealing for the valve. Yet another problem of the patented fluid seal is that the gas sealing lip is lifted from the sealing surface to act as a valve and allow one way fluid flow. A further problem of the patented fluid seal is that the sealing surface for the check valve is made of a rigid material such as steel.

SUMMARY OF THE INVENTION

It is, therefore, one object of the present invention to provide a fluid seal with an integral check valve.

It is another object of the present invention to provide a fluid seal with a check valve which does not require another component to be used as the sealing surface for the check valve.

It is yet another object of the present invention to provide a fluid seal with a check valve which does not require the sealing surface for the check valve to be maintained prior to assembly.

It is a further object of the present invention to provide a fluid seal with a check valve that maintains constant contact to create two separate chambers within the sealed system while allowing one way fluid flow.

It is a still further object of the present invention to provide a fluid seal with a check valve that can be varied for different relief pressures.

It is another object of the present invention to provide a fluid seal which utilizes a durable material as the sealing surface for the check valve.

It is yet another object of the present invention to provide a fluid seal with a check valve having sealing surfaces which are resistant to damage prior to assembly.

It is still another object of the present invention to provide a fluid seal with a check valve which is easier and less expensive to install.

To achieve the foregoing objects, the present invention is a fluid seal adapted to be disposed about a cylindrical shaft. The fluid seal includes a body portion having means forming an aperture extending axially therethrough and adapted to be disposed about the shaft. The fluid seal also includes a first sealing lip extending from the body portion and adapted to contact the shaft. The fluid seal further includes a second sealing lip extending from the body portion and having check valve means for allowing one way fluid flow through the second sealing lip at a desired pressure.

One advantage of the present invention is that the fluid seal incorporates an integral check valve which is created as part of the seal. Another advantage of the present invention is that the fluid seal has a check valve which creates two separate chambers within the sealed system and allows liquid and/or gas flow in one direction but not back in the opposite direction. Yet another advantage of the present invention is that the check valve of the fluid seal utilizes durable elastomer material from the fluid seal itself as the sealing surface. Still another advantage of the present invention is that the sealing surface for the check valve is not susceptible to damage prior to assembly. A further advantage of the present invention is that no specifically machined mating components are required in the sealed system for the check valve of the fluid seal. Yet a further advantage of the present invention is the ability to vary relief pressure of the check valve. A still further advantage of the present invention is that the fluid seal has an integral check valve which provides easier, less expensive installation.

Other objects, feature and advantages of the present invention will be readily appreciated as the same becomes better understood after reading the following description when taken in connection with the accompanying drawings.

BRIEF DESCRIPTION OF THE DRAWINGS

FIG. 1 is a plan view of a fluid seal according to the present invention.

FIG. 2 is a sectional view taken along line 2—2 of FIG. 1 with the fluid seal installed in a motion control damper illustrated in a partial fragmentary view.

FIG. 3 is a view similar to FIG. 2 of the fluid seal in an operating mode.

DESCRIPTION OF THE PREFERRED EMBODIMENT(S)

Figure 4:
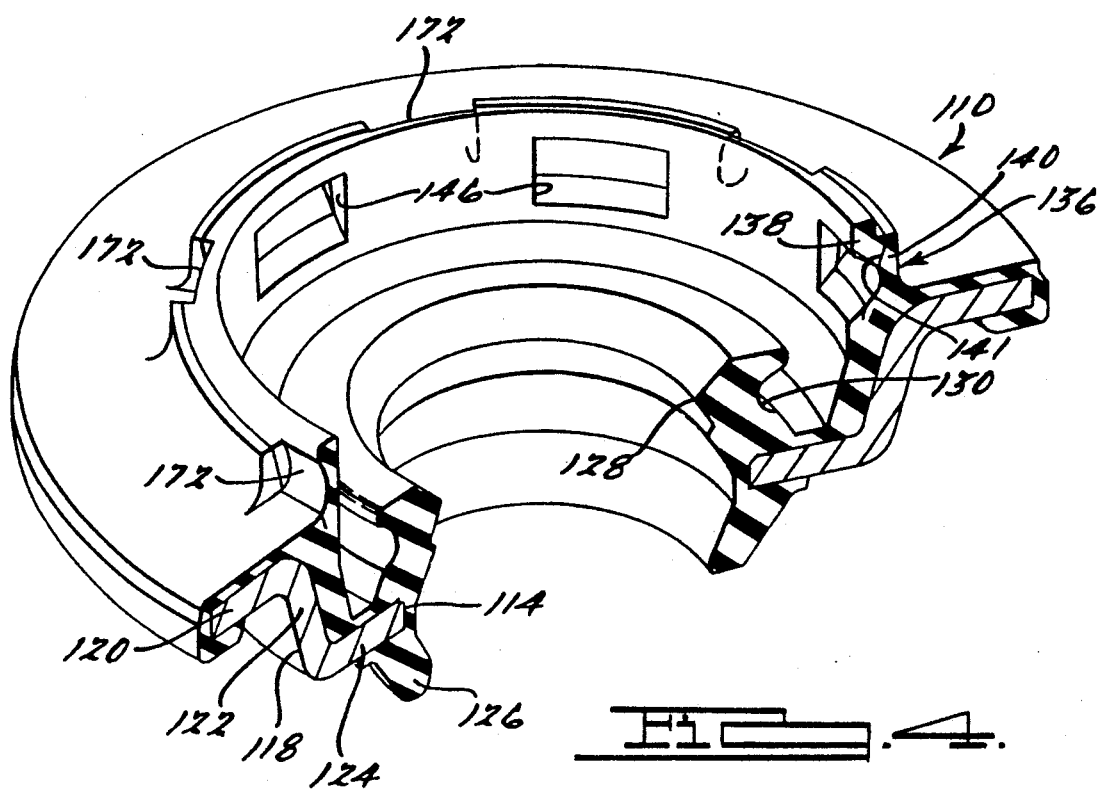
FIG. 4 is a fragmentary perspective view of an alternate embodiment of the fluid seal of FIG. 1.

Referring to FIGS. 1 and 2, a fluid seal 10 according to the present invention is shown. The fluid seal 10 is adapted to be disposed about a cylindrical shaft 12 (illustrated in phantom lines in FIG. 2) such as a piston shaft or rod of a motion control damper or shock absorber, generally indicated at 13. It should be appreciated that the fluid seal 10 may be used in any other suitable appreciation other than a motion control damper.

The fluid seal 10 includes a body portion 14 having a generally cylindrical shape. The body portion 14 has an aperture 15 extending axially therethrough. The shaft 12 is adapted to extend through the aperture 15. The body 14 also has a groove or recess 16 extending radially inwardly. Preferably, the body portion 14 is made of an elastomeric material such as Nitrile having a durometer between about 70 to 90 (Shore A). It should be appreciated that the body portion 14 may be made of any suitable material that is flexible and has memory properties.

The fluid seal 10 may include an insert or casing 18 secured to the body portion 14. The casing 18 is generally annular in shape with an outer flange portion 20, an intermediate stepped portion 22 and an inner flange portion 24. The inner flange portion 24 is disposed within the groove 16 of the body portion 14. The casing 18 is secured to the body portion 14 by suitable means such as an adhesive. The casing 18 adds a desired stiffness to the body portion 14. The casing 18 is preferably made of a metal material such as steel. It should be appreciated that the casing 18 may be made of any suitable material to provide a desired stiffness to the body portion 14. It should also be appreciated that the body portion 14 is molded onto the casing 18 by conventional molding. It should further be appreciated that the casing 18 may have any suitable shape and may not be secured to the body portion 14.

The fluid seal 10 may also include an excluder lip 26 extending axially and radially inwardly at an angle from the body portion 14. The excluder lip 26 is adapted to contact the shaft 12 to exclude or resist dirt and contaminants from entering the aperture 15. The fluid seal 10 further includes a wiper or first sealing lip 28 extending axially opposite to that of the excluder lip 26 and radially inwardly at an angle from the body portion 14. The first sealing lip 28 may have a relief surface 29 extending axially and radially at an angle to provide the first sealing lip 28 with a generally V-shaped cross-section. Preferably, the excluder lip 26 and first sealing lip 28 are integral with the body portion 14 and made of the same elastomeric material. The first sealing lip 28 is adapted to contact the shaft 12 and permit axial movement of the shaft 12. It should be appreciated that the first sealing lip 28 wipes lubricant from the shaft 12 as it moves to allow a thin film of lubricant to be disposed on the shaft 12.

The first sealing lip 28 may include a groove or recess 30 in an outer periphery thereof. The recess 30 is generally arcuate in cross-section and extends radially inward and circumferentially about an outer periphery of the first sealing lip 28. The fluid seal 10 may also include a spring 31 disposed in the recess 30. The spring 31 has a generally circular cross-section and is annular in shape. The spring 31 is made of a metal material and is formed as a coil spring. The spring 31 is adapted to radially urge the first sealing lip 28 against the shaft 12. It should be appreciated that the spring 31 may be made of any suitable material which acts to urge the first sealing lip 28 radially inward.

The fluid seal 10 may also include a retaining portion 32 extending from the body portion 14 along one side of the intermediate offset portion 22 and outer flange portion 20 of the casing 18. The retaining portion 32 has an end flange portion 34 which extends over the end of the outer flange portion 20 and partially along the other side of the outer flange portion 20. The retaining portion 32 is secured to the casing 18 by suitable means such as an adhesive. Preferably, the body portion 14 and retaining portion 32 are integral and made of the same elastomeric material.

The fluid seal 10 further includes a separation or second sealing lip, generally indicated at 36, extending axially from the retaining portion 32 in the same direction as the first sealing lip 28. The second sealing lip 36 includes a seal portion 38 which is adapted to seal against a component of the damper 13 such as an inner cylinder head 456 to be described. The second sealing lip 36 also includes a flap portion 40 which cooperates with the seal portion 38 and acts as a check valve to be described. The flap portion 40 is created by partially knife trimming a slit 41 in the second sealing lip 36 and forming a first sealing surface 42 on the flap portion 40 and a second sealing surface 44 on the seal portion 38. The flap portion 40 is generally circumferential and continuous. The first sealing surface 42 of the flap portion 40 is adapted to seal against the second sealing surface 44 of the seal portion 38. It should be appreciated that the flap portion 40 is made of elastomeric material disconnected by the slit 41 from the second sealing lip 36. It should also be appreciated that the flap portion 40 is resiliently hinged to the second sealing lip 36. It should further be appreciated that a spring (not shown) may be used to urge the flap portion 40 into contact with the seal portion 38.

The second sealing lip 36 also includes a plurality of cavities 46 spaced circumferentially about the second sealing lip 36 opposite the flap portion 40. The cavities 46 extend from an enlarged opening 47 into the second sealing lip 36 and communicate with the slit 41 to allow lubricant and gas flow therebetween. Preferably, the second sealing lip 36 and retaining portion 32 are integral and made of the same elastomeric material. It should be appreciated that a desired relief pressure for allowing fluid flow through the check valve is determined by the size of the opening the slit 41 makes with the cavities 46 and the thickness of the flap portion 40.

Referring to FIGS. 2 and 3, the fluid seal 10 is shown in an installed position within the motion control damper or shock absorber 13. The damper 13 includes a cylindrical outer housing 48 and a cylindrical inner housing 50 spaced radially from the outer housing 48. The outer housing 48 includes a flange 52 extending radially inwardly and terminating to form an aperture 54. Preferably, the aperture 54 is circular in shape and the inner and outer housing 50 and 48 are made of a metal material such as steel.

The damper 13 also includes an inner cylinder head 56 which is generally cylindrical and disposed between the outer and inner housings 48 and 50 and the shaft 12. The inner cylinder head 56 may include a shoulder portion 58 to locate the outer flange portion 20 of the casing 18. The inner cylinder head 56 also includes a passage 60 to permit fluid flow between the shaft 12 and the inner and outer housings 50 and 48. The inner cylinder head 56 has a sealing surface 62 which cooperates with the second sealing lip 36 to divide an interior space within the damper 13 into a first chamber 64 between the shaft 12 and the second sealing lip 36 and a second chamber 66 between the passage 60 and second sealing lip 36. The sealing surface 62 may be inclined. Preferably, the inner cylinder head 56 is made of a metal material such as steel.

Referring to FIGS. 2 and 3, the fluid seal 10 is installed in the damper 13. The outer flange portion 20 is disposed between the shoulder portion 58 of the inner cylinder head 56 and the flange 52 of the outer housing 48. The intermediate stepped portion 22 extends axially through the aperture 54 in the outer housing 48 such that the inner flange portion 24 is not disposed within the outer housing 48. The shaft 12 is extended through the aperture 15 of the body portion 14 and the excluder lip 26 and first sealing lip 28 contact the shaft 12. The second sealing lip 36 extends axially toward the inner cylinder head 56 and the seal portion 38 contacts and seals against the sealing surface 62 to create the separate first and second chambers 64 and 66. It should be appreciated that the shaft 12 is moved axially by suitable means (not shown) of the damper 13.

In operation, lubricant such as oil is disposed in the first chamber 64 at a first predetermined pressure $P_1$. Also, a gas such as air is disposed between the inner and outer housings 50 and 48 and in the passage 60 and second chamber 66 at a second predetermined pressure $P_2$. As illustrated in FIG. 2, if the first and second predetermined pressures $P_1$ and $P_2$ are equal, such as at static state or at a directional change point of the shaft 12, no fluid flow occurs between the first and second chambers 64 and 66. The first sealing surface 42 of the flap portion 40 remains in contact with the second sealing surface 44 of the seal portion 38.

If the first predetermined pressure $P_1$ is less than the second predetermined pressure $P_2$, such as during compression or retraction of the shaft 12 within the damper 13, the second predetermined pressure $P_2$ forces the flap portion 40 against the sealed portion 38. As a result, the first sealing surface 42 remains in contact with the second sealing surface 44 and no fluid flow occurs between the first and second chambers 64 and 66.

As illustrated in FIG. 3, if the first predetermined pressure $P_1$ is greater than the second predetermined pressure $P_2$, such as during extension of the shaft 12, the first predetermined pressure $P_1$ causes lubricant to flow through the cavities 46 and deflect the flap portion 40 such that the first sealing surface 42 is no longer in contact with the second sealing surface 44 to allow fluid flow between the first and second chambers 64 and 66. As a result, lubricant flows through the cavities 46 and between the first and second sealing surfaces 42 and 44 and into the second chamber 66. When the first predetermined pressure $P_1$ no longer overcomes the desired relief pressure or $P_1$ becomes less than the second predetermined pressure $P_2$, fluid flow stops and the flap portion 40 seals against the seal portion 38.

Figure 5:
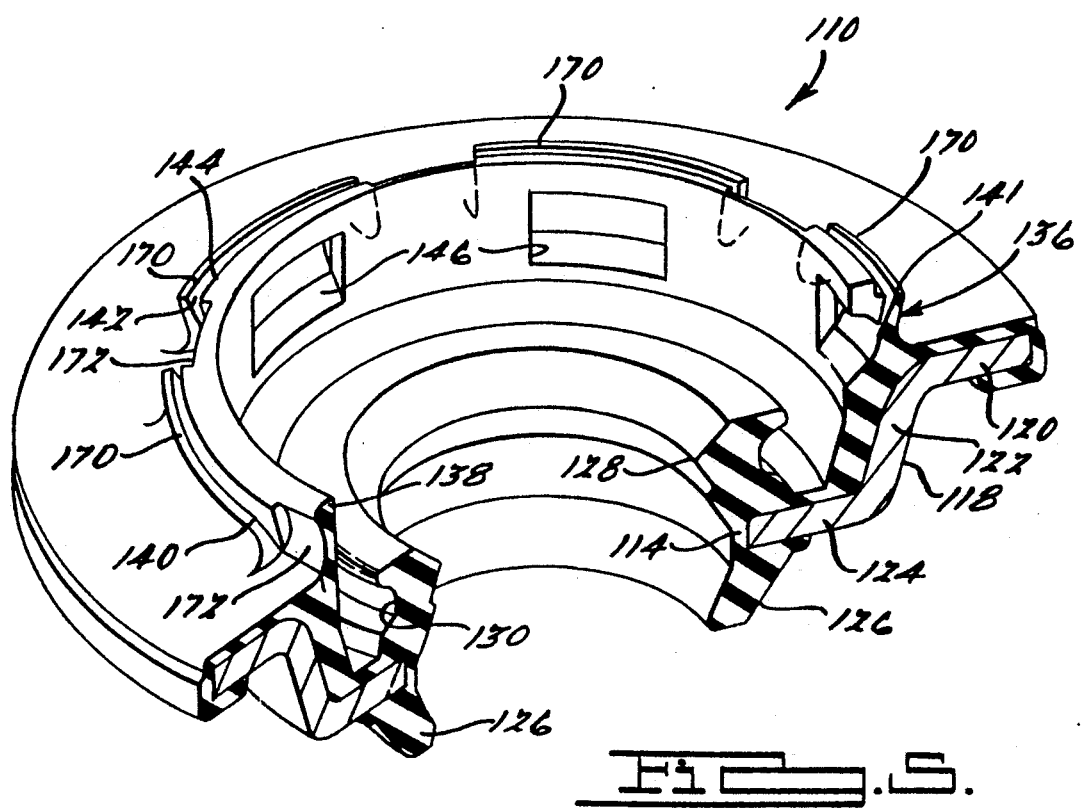
FIG. 5 is a view similar to FIG. 4 of the fluid seal in an operating mode.

Referring to FIGS. 4 and 5, an alternate embodiment 110 of the fluid seal 10 is shown. Like parts of the fluid seal 10 have like numbers increased by one hundred (100). The spring 31 is not shown for the fluid seal 110 although it may be used. In the fluid seal 110, the second sealing lip 136 includes a flap portion 140 which cooperates with the seal portion 138 and acts as the check valve. The flap portion 140 is not continuous circumferentially continuous, but interrupted to form a plurality of individual flaps 170. Preferably, there is one flap 170 for each cavity 146. The interruption in the flap portion 140 is created by molding outer cavities 172 on the outer surface of the second sealing lip 136. Preferably one outer cavity 172 is spaced between a pair of cavities 146. When the second sealing lip 136 is knife trimmed to create the flap portion 140, the knife will break through at each outer cavity 172 so as to create the individual flaps 170. The operation of the flaps 170 is similar to the flap portion 40 of the fluid seal 10.

Accordingly, the present invention provides a second sealing lip 36 which creates first and second chambers 64 and 66 within the damper 13. The second sealing lip 36 maintains constant contact with the inner cylinder head 56 and has a flap portion 40 which acts as a check valve to allow lubricant flow in one direction through the second sealing lip 36, but not back in the opposite direction. The flap portion 40 is made of elastomeric material which seals upon the seal portion 38 of elastomeric material. The flap portion 40 may be a continuous or interrupted circumferential sealing surface 42 that acts as the check valve seal. The present invention has a sealing surface 44 which eliminates the need for mating component with special finishes maintained and being kept in excellent condition to facilitate proper sealing for the check valve. The present invention provides a slit 41 to communicate with the cavities 46 which may be varied in dept and location relative to the cavities and a flap portion 40 with a thickness which may be varied to vary the desired relief pressure of the check valve.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A fluid seal adapted to be disposed about a cylindrical shaft, comprising:
    a body portion including aperture means forming an aperture extending axially therethrough for disposing about the shaft;
    a first sealing lip extending from said body portion to contact the shaft; and
    a second sealing lip extending from said body portion and including check valve means for allowing one way fluid flow through said second sealing lip at a desired pressure; and
    wherein said check valve means comprises a flap portion and a seal portion formed by a slit extending partially into said second sealing lip such that said flap portion and said seal portion overlap each other.

2. A fluid seal as set forth in claim 1 wherein said flap portion and seal portion are integral with said second sealing lip.

3. A fluid seal as set forth in claim 1 wherein said flap portion has a first sealing surface and said seal portion has a second sealing surface, said first sealing surface contacting said second sealing surface.

4. A fluid seal adapted to be disposed about a cylindrical shaft, comprising:
    a body portion including means forming an aperture extending axially therethrough for disposing about the shaft;
    a first sealing lip extending from said body portion to contact the shaft;
    a second sealing lip extending from said body portion and including check valve means for allowing one way fluid flow through said second sealing lip at a desired pressure;

said check valve means comprising a flap portion and a seal portion formed by a slit extending partially into said second sealing lip; and wherein said flap portion is circumferentially continuous.

5. A fluid seal as set forth in claim 1 wherein said flap portion is interrupted circumferentially to form a plurality of flaps.

6. A fluid seal as set forth in claim 1 wherein said flap portion comprises material disconnected by the slit from, and resiliently hinged to, said second sealing lip.

7. A fluid seal as set forth in claim 1 including means forming at least one cavity extending into said second sealing lip and communicating with the slit.

8. A fluid seal as set forth in claim 1 including means forming a plurality of cavities spaced circumferentially and extending into said second sealing lip and communicating with the slit.

9. A fluid seal as set forth in claim 1 including stiffness means for providing a predetermined stiffness to said body portion.

10. A fluid seal as set forth in claim 9 wherein said stiffness means comprises a casing being generally annular, said body portion being secured to said casing.

11. A fluid seal as set forth in claim 10 wherein said casing has an outer flange portion, an intermediate stepped portion and an inner flange portion.

12. A fluid seal as set forth in claim 11 wherein said body portion has a groove extending radially inwardly, said inner flange portion being disposed in said groove.

13. A seal as set forth in claim 1 including an excluder lip extending radially and axially from said body portion toward the shaft to contact the shaft to exclude contaminants from said aperture.

14. A seal as set forth in claim 1 including spring means for urging said first sealing lip into contact with the shaft.

15. A seal as set forth in claim 14 wherein said body portion includes an annular recess in an outer periphery thereof.

16. A seal as set forth in claim 15 wherein said spring means comprises a spring disposed in said recess.

17. A fluid seal adapted to be disposed about a cylindrical shaft, comprising:

a body portion including aperture means forming an aperture extending axially therethrough for disposing about the shaft;

an excluder lip extending radially and axially from said body portion toward the shaft for contacting the shaft to exclude contaminants from said aperture;

a first sealing lip spaced axially from said excluder lip and extending from said body portion to contact the shaft;

a second sealing lip extending from said body portion and including a flap portion and a seal portion formed by a slit extending partially into said second sealing lip such that said flap portion and said seal portion overlap each other to form a check valve for allowing one way fluid flow through said second sealing lip at a desired pressure; and said flap portion having a first sealing surface and said seal portion having a second sealing surface, said first sealing surface contacting said second sealing surface.

18. A fluid seal as set forth in claim 17 including means forming a plurality of cavities spaced circumferentially and extending into said second sealing lip and communicating with the slit.

19. A fluid seal as set forth in claim 18 including mean for providing a predetermined stiffness to said body portion.

20. A seal as set forth in claim 19 including spring means for urging said first sealing lip into contact with the shaft.

21. A fluid seal adapted to be disposed about a cylindrical shaft, comprising:

a body portion including aperture means forming an aperture extending axially therethrough for disposing about the shaft;

a casing being generally annular, said body portion being secured to said casing;

a first sealing lip extending from said body portion to contact the shaft;

a second sealing lip extending from said body portion and including a flap portion and a seal portion overlapping each other to form a check valve for allowing one way fluid flow through said second sealing lip at a desired pressure;

an excluder lip spaced axially from said first sealing lip and extending radially and axially from said body portion toward the shaft to contact the shaft to exclude contaminants from said aperture;

a spring for urging said first sealing lip into contact with the shaft;

said flap portion and seal portion being integral with said second sealing lip, said flap portion having a first sealing surface and said seal portion having a second sealing surface, said first sealing surface contacting said second sealing surface; and means forming a plurality of cavities spaced circumferentially and extending into said second sealing lip and communicating with the slit.

* * * * *